(12) United States Patent
Takagi et al.

(10) Patent No.: US 8,753,211 B2
(45) Date of Patent: Jun. 17, 2014

(54) GAME SYSTEM

(71) Applicant: DeNA Co., Ltd., Tokyo (JP)

(72) Inventors: Yuzo Takagi, Tokyo (JP); Yuuki Abe, Tokyo (JP); Satoshi Sekiguchi, Tokyo (JP); Takehiro Kusano, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/851,817

(22) Filed: Mar. 27, 2013

(65) Prior Publication Data
US 2013/0316835 A1    Nov. 28, 2013

(30) Foreign Application Priority Data
May 17, 2012    (JP) .................................. 2012-113796

(51) Int. Cl.
*A63F 13/12*    (2006.01)

(52) U.S. Cl.
USPC .................................. 463/42; 463/31; 463/43

(58) Field of Classification Search
USPC .............................................. 463/42, 43, 31
See application file for complete search history.

(56) References Cited

U.S. PATENT DOCUMENTS

| | | | |
|---|---|---|---|
| 6,533,663 B1 * | 3/2003 | Iwao et al. ........................ | 463/32 |
| 6,745,236 B1 * | 6/2004 | Hawkins et al. .............. | 709/218 |
| 2011/0201426 A1 | 8/2011 | Fujimoto ........................ | 463/31 |

FOREIGN PATENT DOCUMENTS

| | | |
|---|---|---|
| JP | 2000-167239 | 6/2000 |
| JP | 2002-239217 | 8/2002 |
| KR | 10-2011-0055719 | 5/2011 |

OTHER PUBLICATIONS

Korean Office Action in connection with Korean Patent Application No. 10-2013-0027053 issued on Sep. 13, 2013.
Japanese Office Action issued on Aug. 30, 2012 in Japanese Patent Application No. 2012-113796.
Japanese Office Action issued on Dec. 4, 2012 in Japanese Patent Application No. 2012-229945.
Fighting Studio, "Play Station R Perfect Conquest Series 110, Spectral Blade, Ultimate Conquest Method," Futabasha Publishers, Ltd., Jan. 10, 2000, pp. 6, 7, 23, and 24.
Nobuto Fujii, et al., "Strategy-acquisition Scheme for Strategic Card Game," IPSJ Journal [CD-ROM], Japan, Information Processing Society of Japan, Dec. 15, 2009, vol. 50, No. 12, pp. 2796-2806.
Certificate for Application of Provision of Exception to Lack of Novelty on Invention for Japanese Patent Application No. 2012-113796 dated Jun. 15, 2012.

* cited by examiner

*Primary Examiner* — Omkar Deodhar
(74) *Attorney, Agent, or Firm* — Pillsbury Winthrop Shaw Pittman LLP

(57) ABSTRACT

Various embodiments of the present invention provide a game system that enables a player to easily select an item to be used by a player character. The game system according to an embodiment of the present invention comprises a selection unit configured to select, from player game contents owned by a player, one or more game contents to be used by a player character of the player in a battle with an opponent character, based at least on an effective value calculated by the effective value calculating unit.

12 Claims, 12 Drawing Sheets

| Player Identification Information | Level | Physical Strength | Intelli-gence | Life | Maximum Number of Usable Items | Maximum Item Points | Group |
|---|---|---|---|---|---|---|---|
| P000001 | 12 | 131 | 68 | 259 | 3 | 120 | Group 1 |
| P000002 | 5 | 47 | 27 | 96 | 3 | 50 | Group 1 |
| P000003 | 9 | 85 | 41 | 170 | 3 | 90 | Group 1 |
| P000004 | 1 | 10 | 5 | 19 | 3 | 10 | Group 2 |
| P000005 | 27 | 255 | 121 | 574 | 4 | 270 | Group 2 |
| ... | ... | ... | ... | ... | ... | ... | ... |

Fig. 4

| Player Identification Information | Owned Item 1 | Owned Item 2 | Owned Item 3 | Owned Item 4 | Owned Item 5 | Owned Item 6 |
|---|---|---|---|---|---|---|
| P000001 | M000001 | M000003 | M000009 | M000007 | M000013 | M000014 |
| P000002 | M000003 | M000004 | M000007 | M000008 | M000013 | M000015 |
| P000003 | M000005 | M000001 | M000008 | M000010 | M000013 | M000015 |
| P000004 | M000003 | M000004 | M000009 | N/A | M000014 | M000015 |
| P000005 | M000004 | M000005 | M000010 | M000011 | M000015 | N/A |
| ... | ... | ... | ... | ... | ... | ... |

Fig. 5

| Game Content Identification Information | Game Content Attribute | Name | Image | Offensive Power | Defensive Power | Consumed Item Points |
|---|---|---|---|---|---|---|
| M000001 | sword | sword A | http://aaa/aaa.jpg | 20 | 0 | 25 |
| M000002 | sword | sword B | http://aaa/bbb.jpg | 30 | 0 | 30 |
| M000003 | spear | spear A | http://aaa/ccc.jpg | 25 | 0 | 20 |
| M000004 | spear | spear B | http://aaa/ddd.jpg | 50 | 0 | 40 |
| M000005 | stick | stick A | http://aaa/eee.jpg | 3 | 0 | 5 |
| M000006 | stick | stick B | http://aaa/fff.jpg | 5 | 0 | 15 |
| M000007 | armor | armor A | http://ddd/aaa.jpg | 0 | 30 | 30 |
| M000008 | armor | armor B | http://ddd/bbb.jpg | 0 | 40 | 60 |
| M000009 | shield | shield A | http://ddd/ccc.jpg | 0 | 15 | 15 |
| M000010 | shield | shield B | http://ddd/ddd.jpg | 0 | 30 | 35 |
| M000011 | helmet | helmet A | http://ddd/eee.jpg | 0 | 5 | 10 |
| M000012 | helmet | helmet B | http://ddd/fff.jpg | 0 | 10 | 20 |
| M000013 | water magic | magic A | http://mmm/aaa.jpg | 30 | 0 | 10 |
| M000014 | fire magic | magic B | http://mmm/bbb.jpg | 35 | 0 | 10 |
| M000015 | wind magic | magic C | http://mmm/ccc.jpg | 40 | 0 | 10 |

Fig. 6

| OC Identification Information | OC Attribute 1 | OC Attribute 2 | OC Attribute 3 | Offensive Power | Defensive Power | Life |
|---|---|---|---|---|---|---|
| OC0001 | sword | armor | fire magic | 34 | 98 | 312 |
| OC0002 | spear | armor | fire magic | 122 | 47 | 123 |
| OC0003 | stick | shield | fire magic | 45 | 203 | 56 |
| OC0004 | sword | shield | water magic | 52 | 91 | 51 |
| OC0005 | spear | shield | wind magic | 33 | 78 | 149 |
| ... | ... | ... | ... | ... | ... | ... |

| OC Identification Information | Player Identification Information: P000001 | | | | | |
|---|---|---|---|---|---|---|
| | OC Attribute 1 | | OC Attribute 2 | | OC Attribute 3 | |
| OC0001 | sword | 1 | armor | 1 | fire magic | 0 |
| OC0002 | spear | 0 | armor | 1 | fire magic | 0 |
| OC0003 | stick | 1 | shield | 0 | fire magic | 0 |
| OC0004 | sword | 1 | shield | 1 | water magic | 0 |
| OC0005 | spear | 0 | shield | 0 | wind magic | 0 |
| ... | ... | | ... | | ... | |

Fig. 8b

| OC Identification Information | Player Identification Information: P000002 | | | | | |
|---|---|---|---|---|---|---|
| | OC Attribute 1 | | OC Attribute 2 | | OC Attribute 3 | |
| OC0001 | sword | 0 | armor | 1 | fire magic | 0 |
| OC0002 | spear | 0 | armor | 0 | fire magic | 0 |
| OC0003 | stick | 1 | shield | 0 | fire magic | 1 |
| OC0004 | sword | 1 | shield | 1 | water magic | 1 |
| OC0005 | spear | 1 | shield | 1 | wind magic | 1 |
| ... | ... | | ... | | ... | |

GAME SYSTEM

CROSS-REFERENCE TO RELATED APPLICATIONS

This application is based on and claims the benefit of priority from Japanese Patent Application Serial No. 2012-113796, filed on May 17, 2012, the contents of which are hereby incorporated by reference in their entirety.

TECHNICAL FIELD

The present invention relates to a game system for providing a video game.

BACKGROUND

There are known games wherein in-game scenario is progressed by matching a player character operated by player input against an opponent character. For example, one of the these types of role-playing game is disclosed in Japanese Patent Application Publication No. 2002-239217 (the "'217" Publication) wherein a player character uses an item such as a weapon selected by a user to battle with an enemy character. As disclosed in the '217 Publication, a player character typically uses a game content such as an item selected by player operation to battle with an enemy character.

SUMMARY

In typical video games, a player character may own a large number of items by discovering or purchasing game contents in the game space. It is sometimes difficult for a player to select from a large number of owned items a game content best suited to be used by the player character for battling with an opponent character.

In some games, attributes are assigned to game contents used by a player character as well as to opponent characters; and the effectiveness of the game contents used by the player character varies depending on match-ups between the attributes assigned to the game contents and the opponent characters. In such video games, a game content best suited for battling with some opponent characters is not necessarily best suited for battling with other opponent characters; therefore, a player finds further difficulty in selecting a best suited game content in battling against a particular opponent.

To overcome this problem, one object of the present invention is to provide a game system that enables a player to easily select an item to be used by a player character. Other objects of the present invention will be described in the entirety of this specification.

A game control system according to an embodiment of the present invention is a game system for controlling progression of a game involving one or more opponent characters, the game system being connected via a network to one or more terminal devices each operated by each of one or more players, the game system comprising: a game content ownership information storage unit configured to store one or more game content identifications each identifying one of one or more player game contents owned by one of the one or more players, in association with a player identification identifying said one of the one or more players; a game content information storage unit configured to store one or more game content attribute identifications and one or more game content parameter values in association with one of the game content identifications, said one or more game content attribute identifications each representing one or more game content attributes assigned to each of the game contents, and said one or more game content parameter values characterizing the game contents; a specific attribute information storage unit configured to store specific attribute information for each of the opponent characters in association with each one of the player identifications each identifying one of the one or more players, the specific attribute information being a part or all of one or more opponent character attributes assigned to each of the opponent characters; an effective value calculating unit configured to calculate an effective value of a game content parameter value of a specific game content, in a battle between a player character of a certain player among the one or more players and a certain opponent character among the one or more opponent characters, wherein the effective value calculating unit (a) specifies specific attribute information stored by the specific attribute information storage unit for the certain opponent character in association with a player identification of the certain player, (b) selects the specific game content from the one or more player game contents owned by the certain player, the specific game content being a player game content having a game content attribute corresponding to the specified specific attribute information, and (c) multiplies a game content parameter value of the selected specific game content with a factor; and a selection unit configured to select, from the one or more player game contents owned by the certain player, one or more game contents to be used by the player character of the certain player in the battle, based at least on the effective value calculated by the effective value calculating unit.

A game device according to an embodiment of the present invention is a game device for performing a game involving a player character operated based on operation signals generated by input operation by a player, and one or more non-player characters, the game device comprising: a game content information storage unit configured to store one or more game content attribute identifications and one or more game content parameter values in association with one of the game content identifications, said one or more game content attribute identifications each representing one or more game content attributes assigned to each of the game contents, and said one or more game content parameter values characterizing the game contents; a specific attribute information storage unit configured to store specific attribute information for each of the opponent characters in association with each one of the player identifications each identifying one of the one or more players, the specific attribute information being a part or all of one or more opponent character attributes assigned to each of the opponent characters; an effective value calculating unit configured to calculate an effective value of a game content parameter value of a specific game content, in a battle between the player character and a certain opponent character among the one or more opponent characters, wherein the effective value calculating unit selects the specific game content from the one or more game contents owned by the player, the specific game content being a game content having a game content attribute corresponding to the specific attribute information, and multiplies a game content parameter value of the selected specific game content with a factor; and a selection unit configured to select, from the one or more game contents owned by the player, one or more game contents to be used by the player character in the battle, based at least on the effective value calculated by the effective value calculating unit.

A method according to an embodiment of the present invention is a method of performing a game involving a player character operated based on operation signals generated by input operation by a player, and one or more non-player characters, the method using a computer and comprising the steps of: storing one or more game content identifications each identifying one of one or more player game contents owned by one of the one or more players, in association with a player identification identifying said one of the one or more players; storing one or more game content attribute identifications and one or more game content parameter values in association with one of the game content identifications, said one or more game content attribute identifications each representing one or more game content attributes assigned to each of the game contents, and said one or more game content parameter values characterizing the game contents; storing specific attribute information for each of the opponent characters in association with each one of the player identifications each identifying one of the one or more players, the specific attribute information being a part or all of one or more opponent character attributes assigned to each of the opponent characters; calculating an effective value of a game content parameter value of a specific game content, in a battle between a player character of a certain player among the one or more players and a certain opponent character among the one or more opponent characters, wherein the effective value calculating unit (a) specifies specific attribute information stored in the specific attribute information storage step for the certain opponent character in association with a player identification of the certain player, (b) selects the specific game content from the one or more player game contents owned by the certain player, the specific game content being a player game content having a game content attribute corresponding to the specified specific attribute information, and (c) multiplies a game content parameter value of the selected specific game content with a factor; and selecting, from the one or more player game contents owned by the certain player, one or more game contents to be used by the player character of the certain player in the battle, based at least on the effective value calculated in the effective value calculating step.

Various embodiments of the present invention provide a game system that enables a player to easily select an item to be used by a player character.

BRIEF DESCRIPTION OF THE DRAWINGS

FIG. 4 shows an example of player character information management table used in a game system according to the embodiment of the present invention.

FIG. 5 shows an example of owned game content management table used in a video game system according to the embodiment of the present invention.

FIG. 6 shows an example of game content information management table used in a game system according to the embodiment of the present invention.

FIG. 7 shows an example of opponent character information management table used in a game system according to the embodiment of the present invention.

FIGS. 8a and 8b show examples of specific attribute information management table used in a game system according to the embodiment of the present invention.

DESCRIPTION OF EXAMPLE EMBODIMENTS

Figure 1:
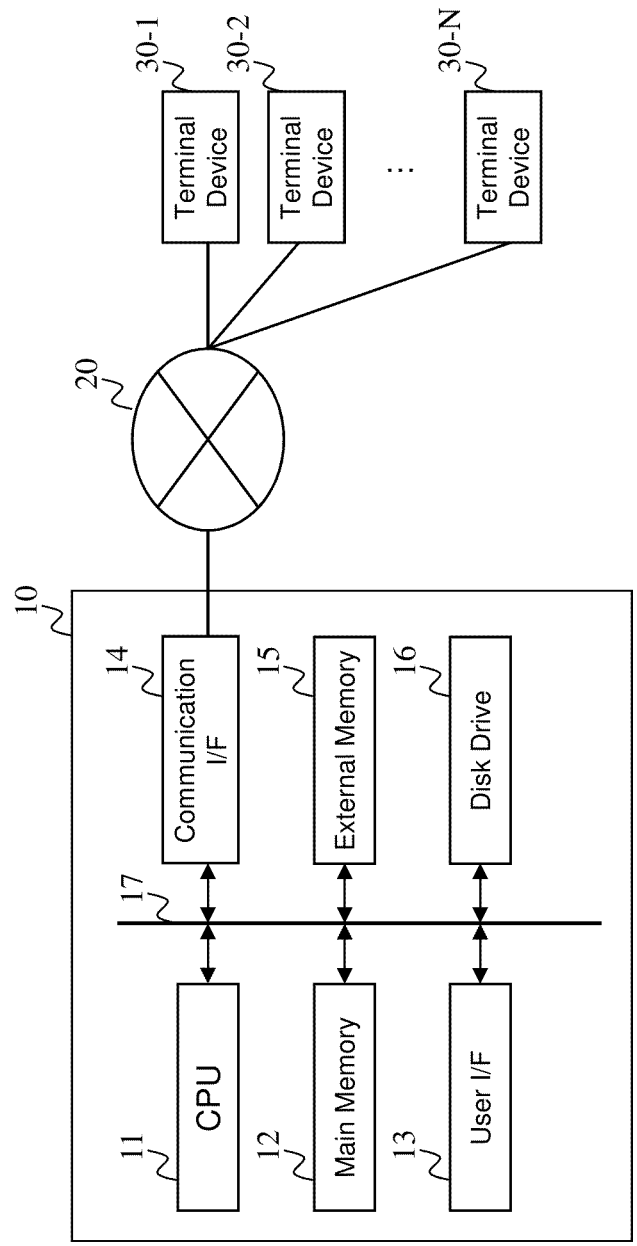
FIG. 1 is a block diagram schematically illustrating a game system according to an embodiment of the present invention.

Various embodiments of the present invention will be described hereinafter with reference to the appended drawings. In the drawings, the same components are denoted by the same reference numerals.

FIG. 1 is a block diagram schematically illustrating a game system according to an embodiment of the present invention. As illustrated in FIG. 1, in the embodiment of the present invention, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a video game system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The external memory 15 may store, for example, a player character information management table, an owned game content management table, a game content information management table, an opponent character information management table, and a specific attribute information management table that contains various data in accordance with the progression of the game (these tables will be described later). Also, these tables may be stored on a database server communicatably connected to the server device 30 and physically separate from the server device 10. The disk drive 16 may read data stored in a storage medium such as a compact disc read only memory (CD-ROM), digital versatile disc read only memory (DVD-ROM), or DVD Recordable (DVD-R) disc, or writes data to such a storage medium. For example, a game application and data such as game data stored in a storage medium may be read by the disk drive 16, and may be installed into the external memory 15.

In an embodiment, the server device 10 may be a web server for managing a web site including a plurality of hierarchical web pages and may be capable of providing the terminal devices 30 with game services. The terminal devices 30 may fetch HTML data for rendering a web page from the server device 10 and analyze the HTML data to present the web page to a user (a player of the game) of the terminal devices 30. A game provided through such a web page is sometimes called a browser game. The HTML data for rendering the web page may also be stored on the external memory 15. HTML data may comprise HTML documents written in markup languages such as HTML; the HTML documents may be associated with various images. Additionally, the HTML documents may include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs are created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU 31; the received game programs may be sent to an external memory 35 and stored thereon. The application software may be launched in accordance with the player's operation on the terminal device 30 and may be executed on a platform implemented on the terminal device 30 such as NgCore™ or Android™. The server device 10 may provide the game applications executed on the terminal devices 30 with various data required for progression of the games. Additionally, the server device 10 can store various data sent from the terminal device 30 for each player, thereby managing the progression of the game for each player.

Thus, the server device 10 may manage the web site for providing game services and deliver web pages constituting the web site in response to a request from the terminal device 30, thereby progressing the game. Also, the server device 10 can progress a game by communicating with a game application performed on the terminal device 30 in place of, or in addition to, such a browser game. Whichever mode may be taken to provide the game, the server device 10 can store data required to progress the game for each identification identifying a player (described later). The server device 10 may also include a function to authenticate a player at start of the game and perform charging process in accordance with progression of the game. A detailed description for this function will be omitted. The games provided by the server device 10 may include desired games such as action games, roll playing games, interactive baseball games, and card games. The types of the games implemented by the web site or game applications of the server device 10 are not limited to those explicitly described herein.

In an embodiment, the terminal device 30 may be a desired information processing device capable of rendering, on a web browser, web pages of a game web site fetched from the server device 10; for example, the terminal device 30 may be a mobile phone, smart phone, game console, personal computer, touch pad, or electronic book reader, but is not limited thereto. In another embodiment, the terminal device 30 may be a desired information processing device including an application execution environment for executing a game application.

Figure 2:
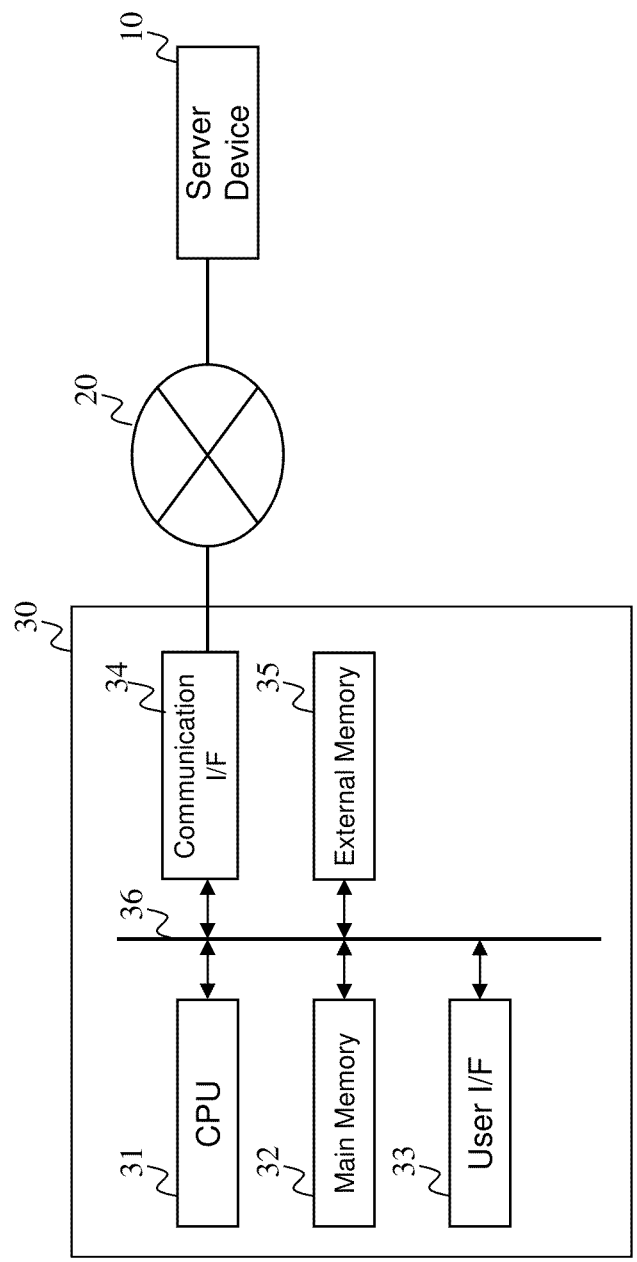
FIG. 2 is a block diagram schematically illustrating the architecture of a terminal device connected to a game system according to the embodiment of the present invention.

The architecture of the terminal device 30 will be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game application from the server device 10 via the communication I/F 34, the external memory 35 may store the received game application.

A terminal device 30 having such an architecture may include, for example, browser software for interpreting an HTML file (HTML data) to render a screen; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) embedded into browser software; therefore, the client device 30 can fetch from the server device 10 a SWF file embedded in HTML data and execute the SWF file by using the browser software and the plug-in software.

When a game is executed on the terminal device 30, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™.

Figure 3:
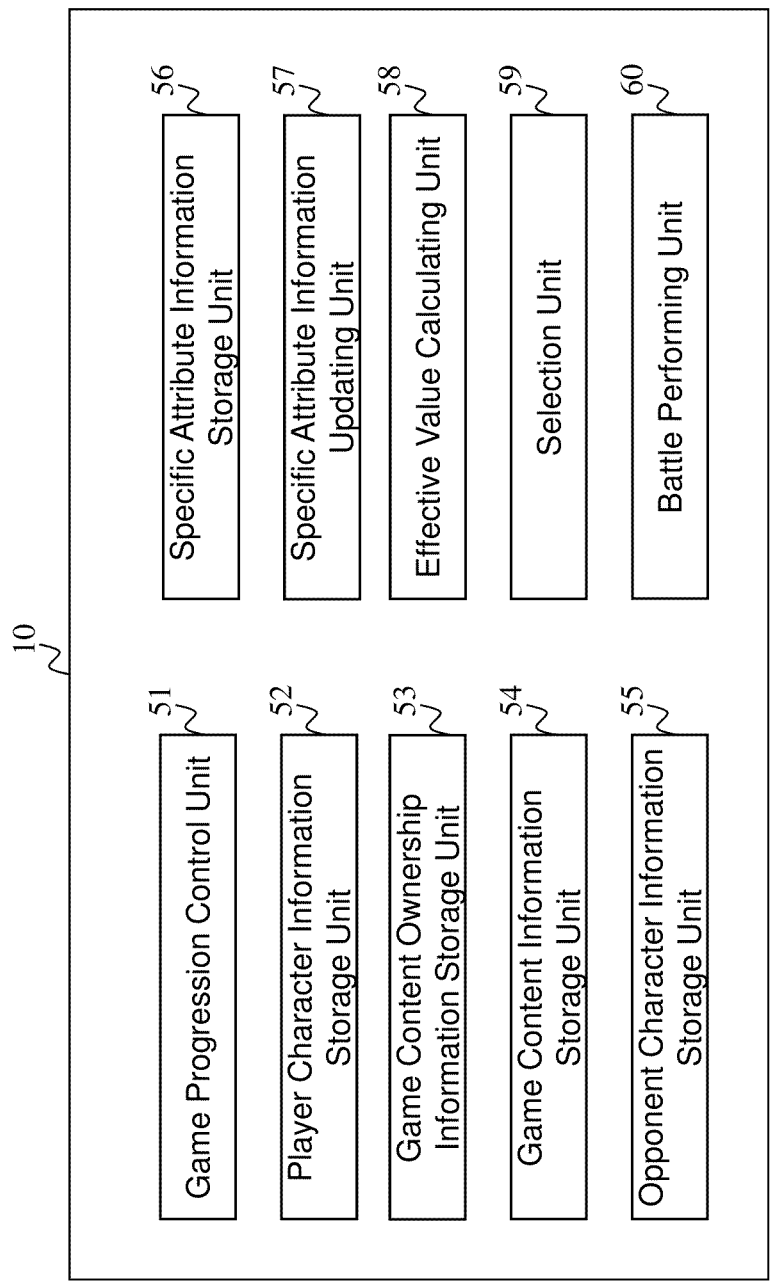
FIG. 3 is a block diagram schematically illustrating a game system according to the embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, the server device 10 according to an embodiment of the present invention may comprise a game progression control unit 51, a player character information storage unit 52, a game content ownership information storage unit 53, a game content information storage unit 54, an opponent character information storage unit 55, a specific attribute information storage unit 56, a specific attribute information updating unit 57, an effective value calculating unit 58, a selection unit 59, and a battle performing unit 60.

The game progression control unit 51 may send and receive various data required for the progression of the game to and from the terminal device 30 and manage such data for each player, thereby controlling the progression of the game for each player. For example, the game progression control unit 51 can sequentially display, on the terminal device 30, web pages constituting a web site for providing game services in response to a request from the terminal device 30. When a hyperlink on the displayed web page is selected by the player, the game progression control unit 51 may send new HTML data corresponding to the hyperlink to the terminal device 30. The terminal device 30 displays a web page based on the new HTML data. Thus, the game progression control unit 51 may control the game such that web pages stored on the server device 10 are sequentially provided to the terminal device 30 in accordance with the operation by the player; and the player can progress the game by his own operation through the function of the game progression control unit 51.

When the terminal device 30 executes the game application, the game progression control unit 51 can send various data used in the game to the game application. For example, when receiving from a game application on the terminal device 30 a control signal indicating that a certain mission has been fulfilled, the game progression control unit 51 may provide the game application with various parameters related to a mission subsequent to the fulfilled mission. The game application may load the data provided by the server device 10 and progress the game.

The terminal device 30 can appropriately send to the server device 10 various information on progression of the game such as information indicating various parameter values used in the game (e.g., information on earned game points and earned items) and information indicating a status (e.g., information specifying a fulfilled mission), through the function of browser software or the game application. The game progression control unit 51 may store, for each player, information on the progression of the game received from a plurality of terminal devices 30, thereby controlling the progression of the game for each player. Thus, when the player logs in the server device 10 using his own ID, the game may be resumed from the stage corresponding to the progression of the player (e.g., the stage where the game was interrupted) based on the information on the progression of the game associated with the player stored in the server device 10. As will be described later, the information required for the progression of the game may also be managed by various functions of the server device 10 other than the game progression control unit 51.

One example of a game provided by the server device 10 is a battle game wherein a player character (also referred to as "PC") controlled in accordance with input from a player is matched against an opponent character (also referred to as "OC") controlled outside the operation of the player. The opponent characters in the embodiments of the present invention may include non-player characters (also referred to as "NPC") controlled by a computer, not by input from players, and player characters of other players. A role-playing game, which progresses through battles between player characters and opponent characters, is a typical example of games provided by the server device 10. Games provided by the server device 10 may also include so-called card games wherein players battle with each other by using their own electronic cards. In the embodiment of the present invention, a player character may install or use game contents such as weapons and protectors selected in accordance with input from the player, thereby to battle with an opponent character. The term "game content" herein collectively refers to electronic data that may be installed or used by a player character appearing in a game provided by the server device 10 for a battle with an opponent character; the term "game content" may include various in-game items such as weapon items, protector items, and magic items that may be installed or used by the player character. For example, a player character may install or use a weapon item selected in accordance with operation of the player, thereby to battle with an opponent character. A game content may be obtained, owned, used, fused, reinforced, sold, discarded, and/or presented in the game by a player.

A player character information storage unit 52 may store, in association with player identifications that identify each player, player character parameter values that characterize player characters used by the player. The player character information storage unit 52 may be implemented by, for example, a player character information management table in the external memory 15. FIG. 4 shows an example of player character information management table used in a game system according to the embodiment of the present invention. As shown, the player character information management table may store, in association with player identifications that identify each player, various player character parameter values of a player character used in the game by the player. In the example shown in FIG. 4, the assigned player character parameter values include "level," "physical strength," "intelligence," and "life." These player character parameter values may be referred to in the battle process (described later) as necessary. The player character parameter values shown in FIG. 4 are mere examples; and various player character parameter values may be stored in accordance with the characteristics of the game. For example, when the server device 10 provides an interactive baseball game, the assigned player character parameter values may include "hitting power" "running ability," and "defensive skill" that characterize baseball players.

"A player identification" may include an identification code that identifies a player of a game and may be composed of, for example, an alphabetic character and a six-digit number combined together. The code system of the player identification is not limited to those explicitly described herein and may be configured desirably. A player identification may be assigned to a player when, for example, the player first logs in a game. Once assigned to a player, the player identification may be continuously used by the same player unless disabled. Thus, the player identification may be unique to a player and identifies the player in a game.

As shown in FIG. 4, the player character information management table may store, in association with a player identification of each player, the maximum number of game contents that can be used by the player character for a battle with an opponent character. FIG. 4 includes a column titled "Maximum Number of Usable Items" that corresponds to the maximum number of usable game contents. This maximum number may be desirably determined by a provider or a developer of the game in accordance with the playability of the game.

Further, as will be described later, each game content has a parameter value "consumed item points" assigned thereto. "Consumed item points" of a game content refers to the number of item points to be consumed when the game content is used for a battle with an opponent character. As shown in FIG. 4, the player character information management table may store, in association with a player identification of each player, the maximum number of game item points that can be consumed by the player character for a battle with an opponent character. FIG. 4 includes a column titled "Maximum Item Points" that corresponds to the maximum number of consumable item points. In the embodiment, a player can select game contents to be used by the player character such that the total of "consumed item points" assigned to one or more game contents used by the player character is equal to or less than "Maximum Item Points" of the player character.

Further, as shown in FIG. 4, the player character information management table may store, in association with a player identification of each player, a group identification that identifies a group including the player (or the player character). In some role-playing games, a plurality of player characters constitute one group, which may form a unit for battling with an opponent character, etc. For example, a player may invite another player into a group by using a message exchange function between players provided by the game; and when the other player accepts the invitation, the other player may be added to the group. In the example shown in FIG. 4, players specified by player identifications "P000001," "P000002," and "P000003" are included in a same group (group 1).

The game content ownership information storage unit 53 may store game content identifications that identifies one or more game contents owned by players (or player characters of the players) in the game, in association with player a identification that identifies the players. For example, the game content ownership information storage unit 53 may be implemented by an owned game content management table provided on, for example, an external memory 15. FIG. 5 shows an example of owned game content management table used in a game system according to the embodiment of the present invention.

As shown, the owned game content management table may store game content identifications that identifies six game items owned by each player in association with a player identification that identifies the player. A maximum number of game contents that can be owned may be assigned to each player. Further, not all players own the maximum number of game contents.

"A game content identification" may include an identification code that identifies a game content owned by a player and may be composed of, for example, an alphabetic character and a six-digit number combined together. The code system of the game content identification is not limited to those explicitly described herein and may be configured desirably. For example, when the player acquires a game content such as a weapon item in a game, the game content is stored in an owned game content management table in association with the player identification of the player who has acquired the game content. When the player newly acquires a game content such as a weapon item, the game content ownership information storage unit 53 causes the owned game content management table to store the game content identification that identifies the newly acquired game content, in association with a player identification of the player who has acquired the game content.

When battling with an opponent character, a player character of a player may install or use a part or all of the game contents stored in the owned game content management table in association with the player identification of the player. In video games, selection of a game content to be used by a game character for a battle with another character may be referred to as "installation" of the game content. That is, a player may cause a player character to "install" a game content for a battle with another character. When this specification states "a game content used" by a player character or states that "a game content is used" by a player character, such statement indicates that a player character "installs" a game content, unless it should be otherwise interpreted according to context; and it does not matter whether the game content is actually used for attacking the opponent character. For example, a player character that has installed "sword A" and "magic A" may use only "sword A" for an attack in accordance with the operation of the player. The owned game content management table may store flags each indicating whether or not an owned item is installed.

The game content information storage unit 54 may store game content attribute identifications that represent one or more game content attributes assigned to a game content and game content parameters that characterize the game content, in association with the game content identification that identifies the game content. For example, the game content information storage unit 54 may be implemented by a game content information management table provided on, for example, an external memory 15. FIG. 6 shows an example of game content information management table used in a game system according to the embodiment of the present invention. As shown, the game content information management table may store game content attributes assigned to a game content, in association with the game content identification that identifies the game content. The example shown in FIG. 6 includes three weapon items: "sword," "spear," and "stick"; three protector items "armor," "shield," and "helmet"; and three magic items: "fire magic," "water magic," and "wind magic." The game content attributes shown in FIG. 6 are mere examples; in the present invention, various attributes may be assigned to a game content in accordance with the characteristics of the game. These game content attributes may form a factor for calculating the amount of damage imparted on an opponent character in an attack thereon or the amount of damage suffered by the player character protecting against an attack by an opponent character. For example, if a player character installs a weapon item having a game content attribute of "sword," a larger amount of damage may be imparted on an opponent character that is configured so as to suffer a larger amount of damage when attacked by "a sword"

Further, the game content information management table may store game content parameters characterizing a game content, in association with the game content identification that identifies the game content. The example shown in FIG. 6 includes "Name," "Image," "Offensive Power," "Defensive Power," and "Consumed Item Points" of a game content, in association with the game content identification that identifies the game content. The column of "Image" in the game content information management table stores URLs that indicates the location where images are stored. "Consumed item points" of a game content refers to the number of item points to be required when the game content is used for a battle with an opponent character. As stated above, each player character has assigned thereto the maximum number of item points that can be used in a battle with an opponent character; therefore, the player character may use game contents under the limitation in terms of "consumed item points."

The opponent character information storage unit 55 may store one or more opponent character attributes assigned to an opponent character and opponent character parameter values that characterize the opponent character, in association with the opponent character identification that identifies the opponent character. The opponent character information storage unit 55 may be implemented by, for example, an opponent character information management table provided in the external memory 15. FIG. 7 shows an example of opponent character information management table used in a game system according to the embodiment of the present invention. As shown, the opponent character information management table may store three opponent character attributes ("Attribute 1" to "Attribute 3") assigned to an opponent character, in association with the opponent character identification that identifies the opponent character. Among these attributes assigned to the opponent character, "Attribute 1" is related to weapon items, "Attribute 2" is related to protector items, and "Attribute 3" is related to magic items. The opponent character attributes of an opponent character typically indicate the relative strength between the opponent character and a game content used by the player character in a battle between the opponent character and the player character. For example, the opponent character identified by "OC0001" has "Attribute 1" set to "sword"; therefore, a battle process may be performed such that an attack using "a sword" is more effective than using other weapon items on the opponent character identified by the opponent character identification "OC0001." The battle process will be described in detail later.

Further, the opponent character information management table may store opponent character parameter values that characterize an opponent character, in association with the opponent character identification that identifies the opponent character. FIG. 7 includes examples of opponent character parameter values: "offensive power," "defensive power," and "life." These opponent character values may be referred to in the battle process (described later).

The specific attribute information storage unit 56 may store specific attribute information of an opponent character in association with the player identification; the specific attribute information may be a part or all of one or more opponent character attributes assigned to the opponent character in the opponent character information management table shown in FIG. 7. The specific attribute information storage unit 56 may be implemented by, for example, a specific attribute information management table provided on an external memory 15. FIGS. 8a and 8b show examples of specific attribute information management table used in a game system according to the embodiment of the present invention. For example, the specific attribute information is set in an opponent character information management table as follows. Conceptually, a player character may install game contents having various game content attributes to battle with an opponent character; and through such battles, a player character may learn what game content attribute is effective against the opponent character; the effectiveness refers to the amount of damage imparted by a weapon item or the amount of damage prevented by a protector item. The information that a certain game content attribute is effective against a certain opponent character may be thus learned and stored as specific attribute information of the opponent character. The specific attribute information and setting and management thereof will be further described with reference to FIGS. 8a and 8b.

As shown in FIGS. 8a and 8b, in an embodiment of the present invention, the specific attribute information management table may store specific attribute information of opponent characters for each player identification. FIG. 8a shows an example of the specific attribute information management table for player identification "P000001"; and FIG. 8b shows an example of the specific attribute information management table for player identification "P000002." The specific attribute information storage unit 56, which manages the specific attribute information management table for each player, will be described for convenience with reference to the two specific attribute information management tables shown in FIGS. 8a and 8b. As shown in FIGS. 8a and 8b, the specific attribute information management table of each player includes attribute flags represented by "0" or "1" for each of the three opponent character attributes assigned to the opponent characters shown in FIG. 7. In the specific attribute information management tables shown in FIGS. 8a and 8b, opponent character attributes whose attribute flag is set to "1" are specific attribute information. For example, in FIG. 8a, the opponent character whose opponent character identification is "OC0001" has attribute flags set to "1" for "Attribute 1" and "Attribute 2" and has an attribute flag set to "0" for "Attribute 3" among the opponent character attributes. Thus, for the player identified by the player identification "P000001," "Attribute 1" and "Attribute 2" among the three opponent character attributes associated with the opponent character identified by the opponent character identification "OC0001" are stored as specific attribute information for the opponent character. As described above, an attribute flag assigned to an opponent character attribute may indicate whether or not the related opponent character attribute is set as specific attribute information. The attribute flag may be altered in accordance with the progression of the game, as will be described later.

The specific attribute information updating unit 57 may update the specific attribute information management table shown in FIGS. 8a and 8b in accordance with a predetermined condition. For example, the specific attribute information updating unit 57 may update the flags indicating specific attribute information in the specific attribute information management table in accordance with the type of the game content used in a battle between the player character and the opponent character. As described above, the player character can learn information on game content attributes effective against the opponent character through a battle with the opponent character. For example, the player character can learn that an item used against the opponent character is effective when the player character attacks the opponent character by using a weapon item or a magic item having the same attribute as the opponent character attribute information of the opponent character or when the player character endures an attack by the opponent character by using a protector item having the same attribute as the opponent character attribute information. The player character can update the specific attribute information management table based on this learning. More specifically, it is supposed that, when the player character (hereinafter the "player character 1") of the player identified by the player identification "P000001" (hereinafter "player 1") battles with the opponent character identified by "OC0001" (hereinafter "opponent character 1"), player character 1 installs or uses "magic B" identified by "M000014" (see FIG. 6). As shown in FIG. 7, "fire magic" is assigned to an opponent character attribute. This corresponds to the game content attribute "fire magic" of "magic B" shown in FIG. 6; therefore, player character 1 may learn that the game content attribute of "fire magic" is effective against opponent character 1. At this moment, the attribute flag for "fire magic" associated with "OC0001" shown in FIG. 8a is updated to "1"; and the updated attribute flag "1" may be stored in the specific attribute information management table. Thus, the player character can learn information on game content attributes effective against the opponent character through a battle with the opponent character and manage the learning with the specific attribute information management table.

Further, the specific attribute information updating unit 57 may update the specific attribute information management table such that the specific attribute information may be shared by a plurality of players included in a same group. As shown in FIG. 4, the player identified by the player identification "P000001" and the player identified by the player identification "P000002" (hereinafter "player 2") are both included in group 1. FIG. 8a for player 1 shows that "Attribute 1" associated with the opponent character identification "OC0001" is set to "1," whereas FIG. 8b for player 2 shows that "Attribute 1" associated with the same opponent character is set to "0." The specific attribute information updating unit 57 may update the specific attribute information management table of player 2 shown in FIG. 8b such that the attribute flag for "Attribute 1" in association with the opponent character identification "OC0001" may be set to "1." Thus, player 1 and player 2, both included in group 1, may share the specific attribute information assigned to "Attribute 1" associated with "OC0001" in the specific attribute information management table of player 1. The same processing may be repeated for specific attribute information assigned for other opponent characters.

When the player character of a player battles with an opponent character, the effective value calculating unit 58 may calculate the effective value of the game content parameter value for each of the game contents owned by the player, based on the specific attribute information stored in the specific information management table shown in FIGS. 8a and 8b. More specifically, the effective value calculating unit 58 may consult the specific attribute information management table (FIGS. 8a and 8b) of the player performing the battle to specify the specific attribute information assigned for the opponent character; next, the effective value calculating unit 58 may consult the owned game content management table shown in FIG. 5 and the game content information management table shown in FIG. 6 to select, from player game contents owned by the player, a player game content having the game content attribute corresponding or equal to the specified specific attribute information. The player game content thus selected having the game content attribute corresponding or equal to the specific attribute information may be herein termed "a specific game content." Further, the effective value calculating unit 58 may multiply the game content parameter value (e.g., offensive power and offensive power) of the selected specific game content by a predetermined adjustment factor, thereby to calculate the effective value of the game content parameter value of the specific game content. The predetermined factor may be desirably determined by the administrator of the server device 10 or the developer of the game in accordance with the game balance, etc. In the embodiment, the predetermined adjustment factor may be a desired number greater than 1, for example, 1.5. The specific game content, having the game content attribute corresponding or equal to the specific attribute information, is effective in a battle with an opponent character having the specific attribute information assigned thereto. Calculation of the effective value of the game content parameter value is a process of making the effectiveness against the specific opponent character reflected on a game content parameter value. For example, a specific game content can impart larger damage on an opponent character when the specific game content has its original offensive power multiplied by an adjustment factor (e.g., 1.5) to calculate an effective value.

The selection unit 59 may select one or more game contents to be used (installed) by the player character of the player in the battle from among game contents owned by the player going into the battle (FIG. 5). For example, to select a weapon item to be used by the player character of player 1, the selection unit 59 may compare the game content parameters of "M000001" and "M000003" owned by player 1 to select one of them having the larger value. However, when a game content owned by player 1 is a specific game content specified by the effective value calculating unit 59, the game content may be compared with other game contents in terms of the effective value calculated by the effective value calculating unit 58, not the game content parameter value stored in the table shown in FIG. 6, versus the game content parameter values of the other game contents.

In the embodiment, the selection unit 59 may select a game content to be used by a player character for each category of game contents. In the example shown in FIG. 6, the game contents identified by "M000001" to "M000006" may be classified into the weapon item category, the game contents identified by "M000007" to "M000012" may be classified into the protector item category, and the game contents identified by "M000013" to "M000015" may be classified into the magic item category.

The battle performing unit 60 may cause the player character to use (install) the game content selected by the selection unit 59 and to perform a battle with the opponent character. Typically, in a battle, a player character and an opponent character may attack each other alternately or simultaneously; and the outcome may be determined based on the damage imparted on the other party through the attacks. Typically, both the player character and the opponent character have parameter values such as "life" and "HP" assigned thereto (see FIGS. 4 and 7); and the parameter values such as "life" of the other party may be reduced by the amount corresponding to the damage imparted on the other party. Finally, the party that has reduced the parameter such as "life" of the other party to zero may win the battle.

The damage imparted on the opponent character by the player character may be calculated based on, for example, the parameter value of "physical strength" assigned to the player character, the parameter value or its effective value of "offensive power" of the game content (typically, a weapon item or magic item) used by the player character (see FIG. 6), and the parameter value of "defensive power" assigned to the opponent character. The damage may be calculated by various methods obvious to those skilled in the art; however, the calculated damage may typically be larger as the parameter values of "physical strength" and/or "offensive power" are larger and as the parameter value of "defensive power" is smaller. Further, the damage imparted on the opponent character may be varied with the game content attribute of the game content used by the player character and the opponent character attribute assigned to the opponent character. More specifically, the damage may be calculated in such a manner that, when the player character attacks the opponent character by using a game content having the same attribute as the opponent character attribute of the opponent character, a larger damage may be imparted on the opponent character. For example, the amount of damage may be calculated such that an opponent character having an opponent character attribute set to "sword" may receive a larger damage when attacked with a weapon item having the attribute of "sword" than attacked with a weapon item such as "spear" or "stick," as long as other conditions are the same.

The damage imparted on the player character by the opponent character may also be determined in the same way. However, the player character receives larger damage as the parameter value of "defensive power" of the protector item used by the player character is smaller. Thus, the battle performing unit 60 may determine the outcome of the battle based on the player character parameter value of the player character involved in the battle, the game content parameter value of the game content used by the player character or the effective value calculated therefrom, and the opponent character parameter value of the opponent character.

Figure 9:
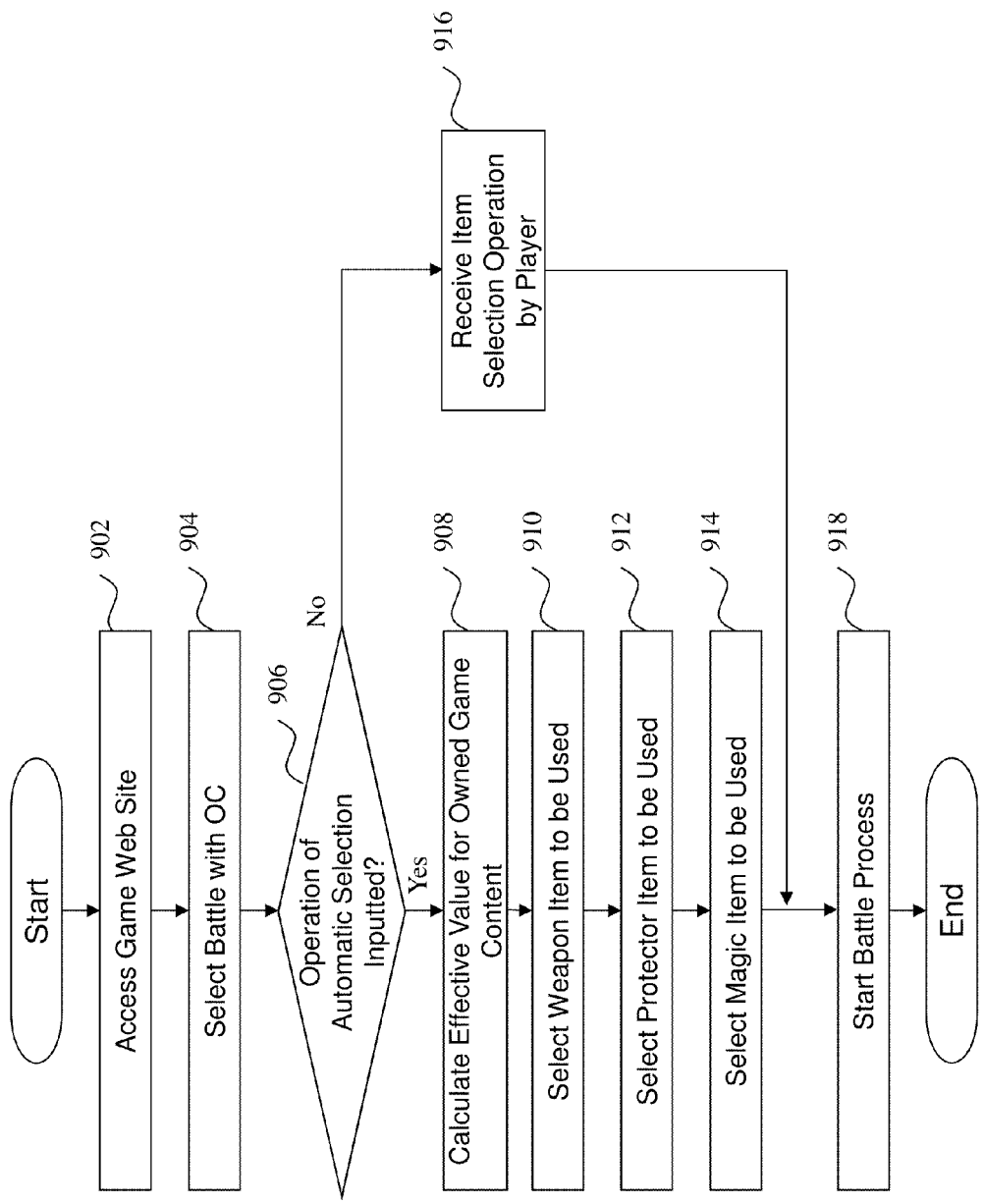
FIG. 9 is a flow diagram showing an example of automatic selection process of game contents according to the embodiment of the present invention.

Next, an example of automatic game content selection process in the embodiment of the present invention will be described below with reference to FIG. 9. FIG. 9 is a flow diagram schematically showing the process of the game provided by the server device 10 from the start of the game until a battle process is started between a player character and an opponent character. FIG. 9 will be described while supposing that the player character of player 1 (hereinafter "player character 1") battles with a non-player character identified by the opponent character identification "OC0001" (hereinafter opponent character 1).

First, in step 902, the terminal device 30 may access a gaming web site on the server device 10 in accordance with operation by player 1. The server device 10 may send to the terminal device 30 a web page corresponding to a request from the terminal device 30. This web page may include a battle-operation button associated with text representing performing a battle with an opponent character such as "Battle with a boss character," in addition to operation buttons for performing a mission required to progress the game and for setting up My Page. When the battle-operation button is selected through input operation on the terminal device 30, the game progression control unit 51 may provide, in step 904, the terminal device 30 with a web page for selecting a game content to be used in the battle with the opponent character.

The web page for selecting a game content to be used in the battle with the opponent character may include an automatic selection operation button for automatically selecting the best game content to be used by the player character, and a customizing operation button for the player to select a game content to be used In step 906, if the player 1 selects the automatic selection operation button through input operation on the terminal device 30, the process may proceed to step 908. In step 908, the effective value calculating unit 58 may calculate an effective value of a game content parameter value of a game content owned by player 1, based on specific attribute information stored in the specific attribute information management table shown in FIGS. 8a and 8b. More specifically, the effective value calculating unit 58 may consult the specific attribute information management table of player 1 shown in FIG. 8a among a group of specific attribute information management tables, thereby to specify the specific attribute information associated with opponent character 1. As shown in FIG. 8a, for opponent character 1 identified by "OC0001," both Attribute 1 set to "sword" and Attribute 2 set to "armor" have an attribute flag set to "1"; therefore, "sword" and "armor" may be specified as specific attribute information.

Next, the effective value calculating unit 58 may consult the game content information management table shown in FIG. 6 for game content attributes of game contents owned by player 1, and select, as specific game contents, game contents having game content attributes corresponding to "sword" or "armor" specified as specific attribute information. As shown in FIG. 5, in the embodiment, player 1 may own six types of game contents identified by game content identifications "M000001," "M000003," "M000009," "M000007," "M000013," and "M000014," respectively. Of these game contents, the weapon item identified by the game content identification "M000001" has the game content attribute corresponding to "sword"; and the protector item identified by the game content identification "M000007" has the game content attribute corresponding to "armor." The effective value calculating unit 58 may select, as specific game contents, the weapon item named "sword A" and identified by the game content identification "M000001" and the protector item named "armor A" and identified by the game content identification "M000007."

Next, the effective value calculating unit 58 may consult the game content information management table shown in FIG. 6, and calculate the effective value of offensive power of "sword A" by multiplying the offensive power "20" of "sword A" selected as a specific game content by a factor "1.5" to obtain "30." Also, the effective value calculating unit 58 may calculate the effective value of defensive power of "armor A" by multiplying the defensive power "30" of "armor A" selected as a specific game content by a factor "1.5" to obtain "45."

Subsequently, in step 910, the selection unit 59 may select a weapon item to be used by player character 1 of player 1 by using the effective value calculated for weapon item. As shown in FIG. 5, the weapon items owned by player 1 are "sword A" identified by the game content identification "M000001" and "spear A" identified by the game content identification "M000003." Suppose that the maximum number of usable items is one. The selection unit 59 may compare the effective value "30" of offensive power of "sword A" with offensive power "25" of "spear A." As a result of the comparison, the selection unit 59 may find that the effective value of offensive power of "sword A" is larger than offensive power of "spear A," and select "sword A" as the weapon item to be used by player character 1. Alternatively, the selection unit 59 may use various algorithms to select a weapon item to be used by player character 1. For example, a weapon item to be used may be selected by comparing the effective value "30" of offensive power of "sword A" and offensive power "25" of "spear A," both divided by respective "consumed item points" (see FIG. 6), i.e., offensive power (or its effective value) per consumed item point, rather than directly comparing these two values. More specifically, the selection unit 59 may compare the effective value "30" of offensive power of "sword A" divided by its consumed item points "25" being "1.2" with the offensive power "25" of "spear A" divided by its consumed item points "20" being "1.25." In this case, the offensive power "1.25" per consumed item point calculated for "spear A" is larger than the offensive power "1.2" per consumed item point calculated for "sword A"; therefore, "spear A" may be selected as the weapon item to be used by player 1.

Further, when the maximum number of usable items is two or larger, the above selection may be repeated until the number of items to be used reaches the maximum number or until the sum of consumed item points of items to be used reaches the maximum item points, the selection being performed from items owned by the player other than items already selected. In the example described above, the selection unit 59 may repeatedly select an item having the highest value for offensive power per consumed item point, etc. until the number of items to be used reaches the maximum number or until there is no items selectable, the selection being performed from the selectable (i.e., unused) items owned by the player other than items already selected, the selectable items having the consumed item points equal to or less than "the maximum item points of the player minus the sum of the consumed item points of the selected items."

Since "spear A" is not selected as a specific game content, the selection unit 59 may use the offensive power of "spear A" as stored in the game content information management table for comparison, without multiplying by the factor. However, the selection unit 59 may calculate the effective value of the offensive power of a game content that is not selected as a specific game content by using a factor smaller than that used by the effective value calculating unit 58 for multiplication on a specific game content. For example, in the case where the factor for multiplication on a specific game content is 1.5, the factor for multiplication on game contents other than the specific game content may be 1.2.

The above-described selection of items based on the value per consumed item point may also be applied to protector items and magic items described below. Also, it can also be applied to protector items and magic items described below to use a smaller factor for multiplication on a game content parameter value of a game content other than a specific game content than a factor used for multiplication on the specific game content, thereby to calculate the effective value of the game content parameter for selecting an item.

Next, in step 912, the selection unit 59 may select a protector item to be used by player character 1 of player 1 by using the effective value calculated for protector item. As shown in FIG. 5, the protector items owned by player 1 are "shield A" identified by the game content identification "M000009" and "armor A" identified by the game content identification "M000007." The selection unit 59 may compare the defensive power "15" of "shield A" with the effective value "45" of defensive power of "armor A." As a result of the comparison, the selection unit 59 may find that the effective value of defensive power of "armor A" is larger than the defensive power of "shield A," and select "armor A" as the protector item to be used by player character 1.

Next, in step 914, the selection unit 59 may select a magic item to be used by the player character 1 of player 1. As shown in FIG. 5, the magic items owned by player 1 are "magic A" identified by the game content identification "M000013" and "magic B" identified by the game content identification "M000014." Since none of "magic A" and "magic B" is a specific game content, these items may be compared in unmodified offensive power. The selection unit 59 may compare the offensive power "30" of "magic A" with offensive power "35" of "magic B." As a result of the comparison, the selection unit 59 may find that the offensive power of "magic B" is larger than offensive power of "magic A," and select "magic B" as the magic item to be used by player character 1. Thus, the game content to be used by player character 1 has been determined for each of weapon item, protector item, and magic item; and the processing may proceed to step 918.

In step 906, if the customizing operation button is selected through input operation on the terminal device 30, the processing may proceed to step 916. In step 916, the game progression control unit 51 may consult the owned game content management table shown in FIG. 5 and generate a list of game contents owned by player 1; and a web page including the list may be displayed on the terminal device 30. As shown in FIG. 5, in the embodiment, player 1 may own six types of game contents identified by "M000001," "M000003," "M000009," "M000007," "M000013," and "M000014"; therefore, the terminal device 30 may display images and game content parameters (offensive power, defensive power, consumed item points, etc.) of these game contents. In accordance with input operation on the terminal device 30 of player 1, one or more game contents to be used by the player character in a battle with opponent character 1 may be selected from these game contents. Further, information (e.g., game content identification) that identifies the game content selected in accordance with input operation by the player may be sent to the server device 10. Thus, the game content to be used by player character 1 has been determined in accordance with operation by the player; and the processing proceeds to step 918.

In step 918, a battle process is started between player character 1 and opponent character 1. More specifically, the battle performing unit 60 may cause player character 1 to use the game content selected in steps 910-914 or step 916, and perform a battle process between player character 1 and opponent character 1. This battle process will be described with reference to FIG. 10.

Figure 10:
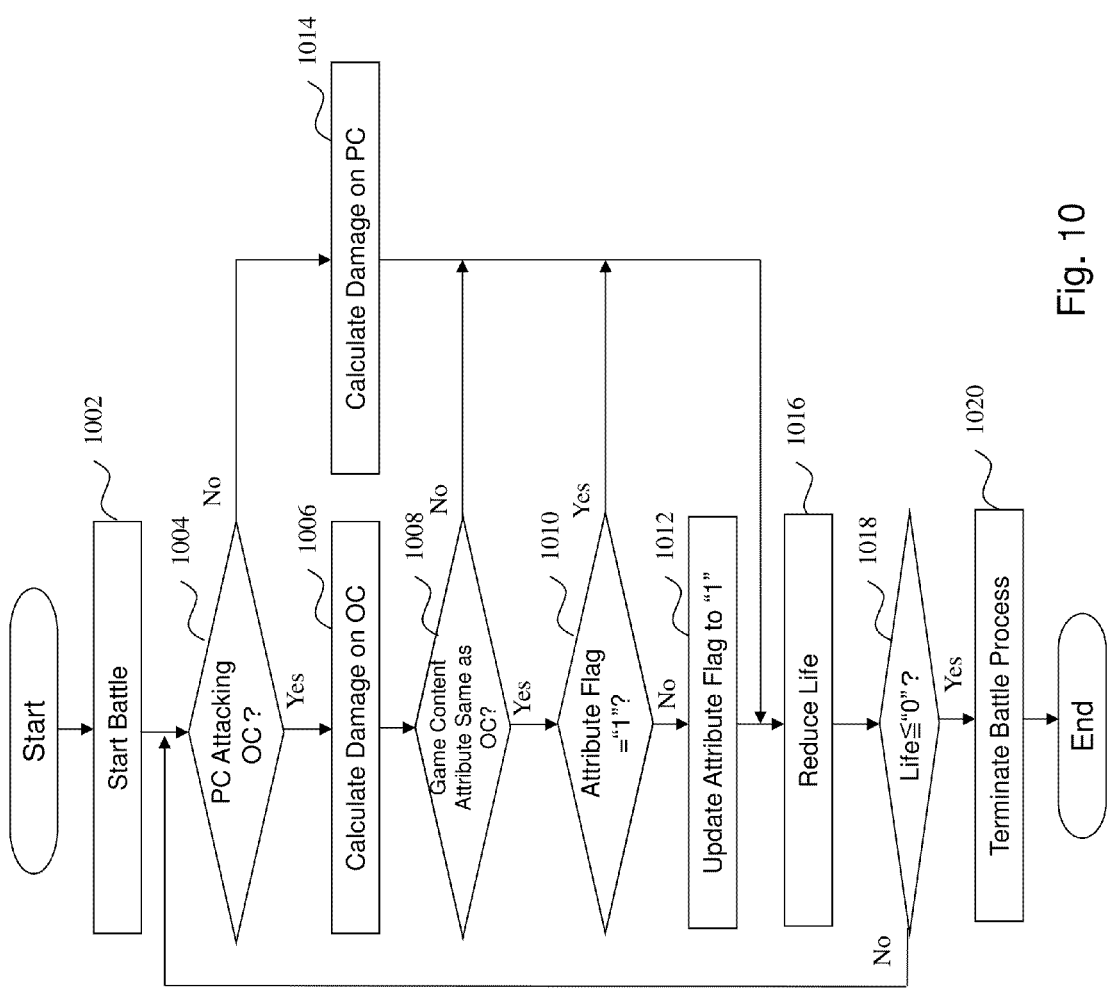
FIG. 10 is a flow diagram showing an example of battle process between a player character and an opponent character according to the embodiment of the present invention.

FIG. 10 is a flow diagram schematically showing the process from selection of a game content to be used by player character 1 to the completion of the battle process between the player character and an opponent character. When a game content to be used by player character 1 is determined in the process shown in FIG. 9, the process proceeds to step 1002 where a battle process between player character 1 and opponent character 1 may be started. For example, this battle process may be started upon instruction for starting the battle inputted by the player through operation of the terminal device 30 after the game content to be used is determined. The process shown in FIG. 10 may be controlled primarily by the battle performing unit 60.

When a battle is started in step 1002, the process may proceed to step 1004 where player character 1 or opponent character 1 attacks the other party. Typically, attacks may be started by either one of player character 1 and opponent character 1 and then continued alternately. When opponent character 1 first attacks, the process may proceed to step 1014 where the amount of damage to be imparted on player character 1 by opponent character 1 may be calculated The amount of damage may be determined based on, for example, the "offensive power" value "34" of opponent character 1 stored in the opponent character information management table shown in FIG. 7, the "physical strength" value "131" of player character 1 stored in the player character information management table shown in FIG. 4, and the effective value "45" of the "defensive power" of the protector item "armor A" used by player character 1. These values may be applied to a predetermined formula to calculate the amount of damage to be imparted on player character 1 by opponent character 1.

Next, in step 1016, the amount of damage calculated in step 1014 may be subtracted from the value of "life" of player character 1 stored in the player character information management table shown in FIG. 4. Next, in step 1018, it may be determined whether or not the value of "life" of player character 1 is equal to or less than "0." If the value of "life" is equal to or less than "0," the process may proceed to step 1020 where the battle process may be terminated. Meanwhile, if the value of "life" is greater than "0," the process may return to step 1004. If player character 1 and opponent character 1 alternately attack each other, it may be determined in step 1004 that the next attack will be made by player character 1, and the process may proceed to step 1006.

In step 1006, the amount of damage to be imparted on opponent character 1 by player character 1 may be calculated. Player character 1 may attack opponent character 1 by using one or both of the weapon item "sword A" and the magic item "magic B". If player character 1 uses "sword A" to attack, for example, the amount of damage to be imparted on opponent character 1 may be determined based on the "physical strength" value "131" of player character 1 stored in the player character information management table shown in FIG. 4, the effective value "30" of the "offensive power" of the weapon item "sword A" used by player character 1, and the "defensive power" value "98" of opponent character 1 stored in the opponent character information management table shown in FIG. 7. For example, these values may be applied to a predetermined formula to calculate the amount of damage to be imparted on opponent character 1 by player character 1. If player character 1 uses "magic B" to attack, the amount of damage may be determined based on the "intelligence" value "68" of player character 1, the effective value "35" of the "offensive value" of the magic item "magic B" used by player character 1, and the "defensive power" value "98" of opponent character 1 stored in the opponent character information management table shown in FIG. 7.

Subsequently, in step 1008, it may be determined whether or not the game content attribute assigned to the game content used by player character 1 in the attack is the same as the opponent character attribute assigned to the opponent character. If the player character uses "magic B" in the attack, the game content attribute of "magic B," i.e., "fire magic," is the same as one of the opponent character attributes (OC Attribute 3) of opponent character 1; therefore, the process may proceed to step 1010. In step 1010, it is determined that, in the specific attribute information management table of player character 1 (see FIG. 8a), the attribute flag of the attribute of "fire magic" associated with opponent character 1 is set to "0"; therefore, this attribute flag may be updated to "1" in step 1012. Meanwhile, if the player character uses "sword A" in the attack, the game content attribute of "sword B," i.e., "sword," is the same as one of the opponent character attributes (OC Attribute 1) of opponent character 1; therefore, the process may also proceed to step 1010. In step 1010, it is determined that, in the specific attribute information management table of player character 1 (see FIG. 8a), the attribute flag of the attribute of "sword" associated with opponent character 1 is set to "1"; therefore, this attribute flag may not be updated, and the process may proceed to step 1016. If the game content attribute assigned to the game content used by player character 1 in the attack is different from the opponent character attribute assigned to the opponent character, the process may proceed from step 1008 to step 1016.

Subsequently, in step 1016, the amount of damage calculated in step 1006 may be subtracted from the value of "life" of opponent character 1. Next, in step 1018, it may be determined whether or not the value of "life" of opponent character 1 is equal to or less than "0." If the value of "life" is equal to or less than "0," the process may proceed to step 1020 where the battle process may be terminated. Meanwhile, the value of "life" is greater than "0," the process may return to step 1004 and repeat the same process as described above. The above process may be repeated, and the party who reduces the "life" of the other party to "0" may become the winner.

As described above, in the embodiment of the present invention, a part or all of opponent character attributes assigned to an opponent character may be managed as specific attribute information based on the past battles with the opponent character and information shared with other players included in the same group. The specific attribute information may indicate the relative strength between an opponent character and a game content attribute, or the effectiveness of a game content attribute against an opponent character. When a player character battles with an opponent character, the player character may use (install) a game content having the same attribute as the specific attribute information assigned to the opponent character, the game content being preferentially selected from the game contents owned by the player. A larger damage may be imparted on the opponent character by using a game content having assigned thereto the same attribute as the specific attribute information than using game contents having other attributes. Thus, the game system according to the embodiment of the present invention may permit a player character to preferentially install a game content that may possibly impart a larger damage on an opponent character. Such a game content may be automatically selected (i.e., without any instruction for selecting a specific game content from the player), except the selecting operation for such selection itself. Accordingly, the player can easily select an item to be used by the player character.

In the embodiment, information on specific attribute information may be obtained from other players included in the same group. When, for example, one of the players included in a group has assigned thereto specific attribute information for an opponent character, the other players included in the group may have the same specific attribute information on the opponent character. The specific attribute information is valuable to players in playing a game, because such information may indicate an attribute effective (i.e., capable of imparting a larger damage) in a battle with an opponent character among game content attributes assigned to a game content. The specific attribute information may be shared among players included in a same group, such that a sense of community may be enhanced between the players. Such functions as to enhance the sense of participation of players and the sense of community with other players may provide particularly important and useful effects in games called social games wherein players interact with other players to progress the games.

In one embodiment of the present invention, a player may determine by himself whether to implement the automatic selection of a game content to be installed. In other words, the player going into a battle with an opponent character may select the above function of automatically and preferentially selecting a game content having the same attribute as the specific attribute information to efficiently select equipments effective against the opponent character, or conversely, the player may manually select a game content having a certain attribute in order to find an attribute more effective in the battle with the opponent character.

Figure 11:
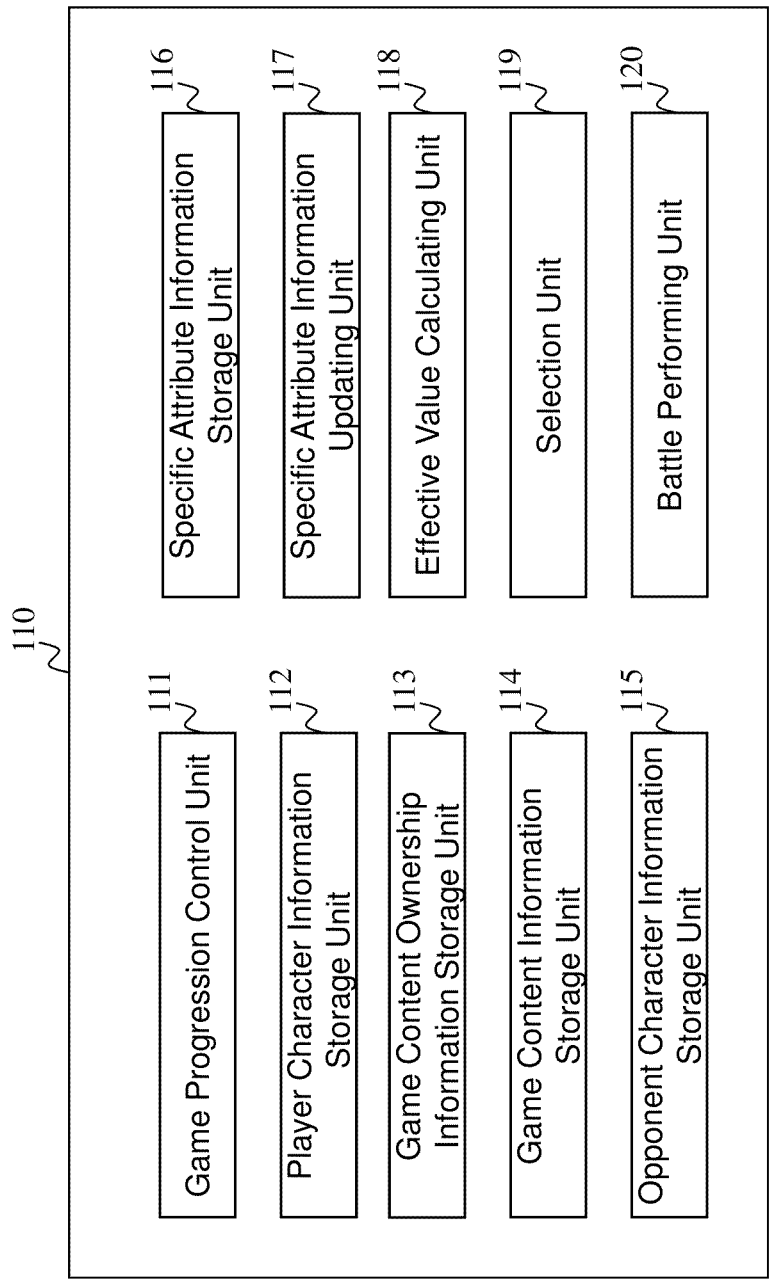
FIG. 11 is a block diagram illustrating the functionality of a terminal device according to another embodiment of the present invention.
Figure 12:
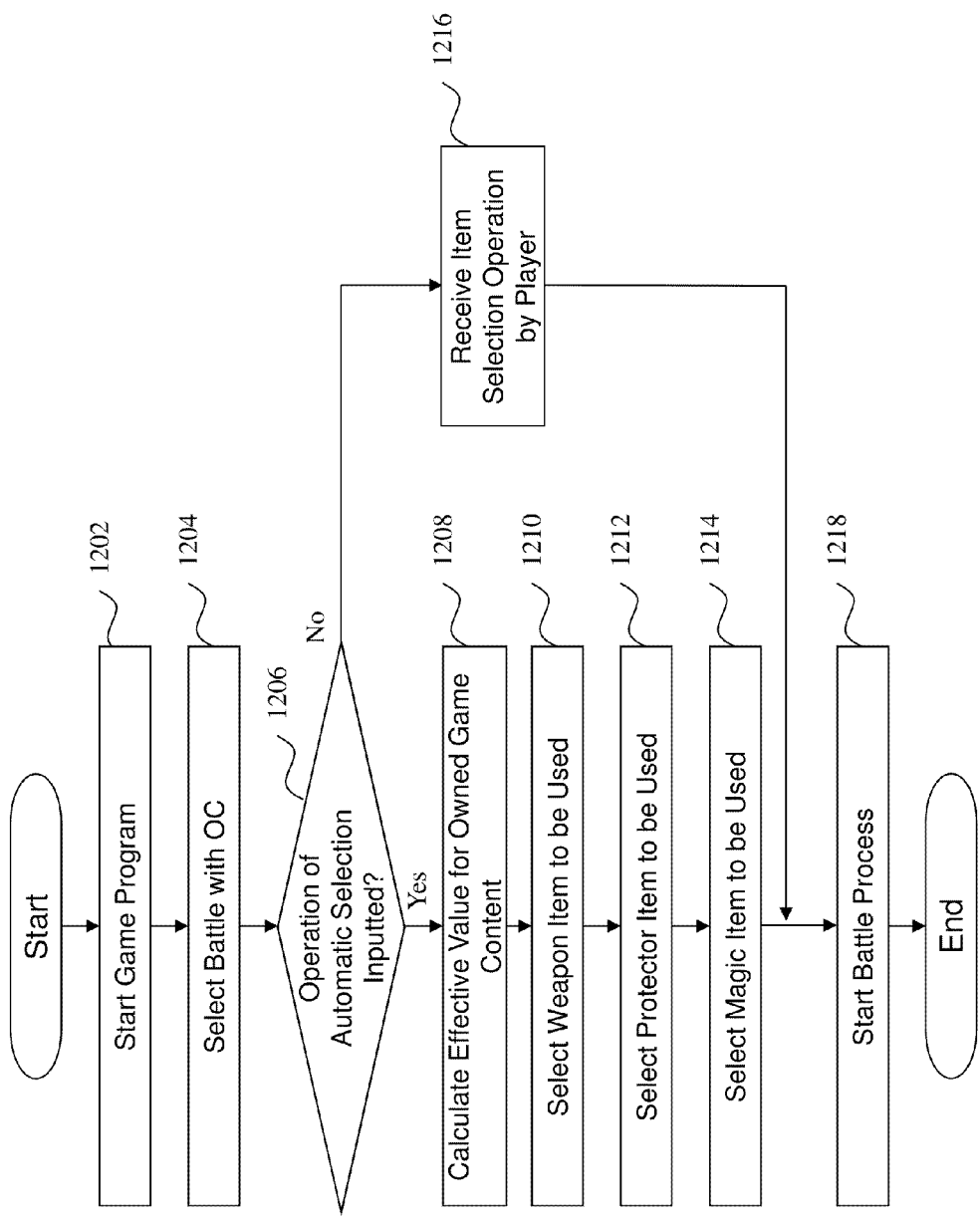
FIG. 12 is a flow diagram showing an example of automatic selection process of game contents according to the other embodiment of the present invention.

Next, a game device according to another embodiment of the present invention will be described with reference to FIGS. 11 and 12. FIG. 11 is a block diagram illustrating the functionality of a terminal device according to the other embodiment of the present invention; and FIG. 12 is a flow diagram schematically illustrating an example of the process of automatically selecting a game content performed in the terminal device of FIG. 11.

The terminal device 110 will be described only for basic features different from those described in FIG. 2 and detailed description corresponding thereto. The terminal device 110 may not necessarily have a communication function. Accordingly, when the terminal device 110 controls a game, it may either control the progression of the game in cooperation with the server device 10 as the terminal device 30 or control the game alone. Such control of games by the terminal device 110 may be implemented by the functions shown in FIG. 11. As shown in FIG. 11, the terminal device 110 according to the other embodiment of the present invention may comprise a game progression control unit 111, a player character information storage unit 112, a game content ownership information storage unit 113, a game content information storage unit 114, an opponent character information storage unit 115, a specific attribute information storage unit 116, a specific attribute information updating unit 117, an effective value calculating unit 118, a selection unit 119, and a battle performing unit 120. These functions may be implemented by the CPU provided in the terminal device 110, the CPU controlling the loading of a certain game program onto a main memory and performing operations based on the instructions in the program.

The functions of the terminal device 110 shown in FIG. 11 are similar to those of the server device 10 shown in FIG. 3;

therefore, the functions of the terminal device 110 will be described with reference to the functions of the server device 10. For example, the game progression control unit 111 may manage various data required for the progression of the game, thereby controlling the progression of the game for each player. The game progression control unit 111 may generate an image that may encourage a player to attempt a certain mission (quest) in accordance with the progression of the game, and display the generated image on the display screen. Also, the game progression control unit 111 may perform processing related to movement of a player character, purchase of a game content, and implementation of a mission, in accordance with operation signals generated by input operation by the player.

The player character information storage unit 112 may store player character parameter values that characterize player characters used by the player of the terminal device 110. The player character information storage unit 112 may be implemented by the same table as the player character information management table shown in FIG. 4, provided in the external memory of the terminal device 110. If the terminal device 110 is used by only one player, the management of player identification is not necessarily required. In this case, character parameter information for the one player of the terminal device 110 has to be stored as in the player character information management table shown in FIG. 4.

The game content ownership information storage unit 113 may store game content identifications that identify one or more game contents owned by players (or player characters of the players) in the game. The game content ownership information storage unit 113 may be implemented by the same table as the owned game content management table shown in FIG. 5, provided in the external memory of the terminal device 110. As described above, if the terminal device 110 is used by only one player, the management of player identification is not necessarily required. In this case, game content identifications of game contents owned by the one player of the terminal device 110 have to be stored as in the owned game content management table shown in FIG. 5.

The game content information storage unit 114 may store game content attribute identifications that represent one or more game content attributes assigned to a game content and game content parameters that characterize the game content, in association with the game content identification that identifies the game content. The game content information storage unit 114 may be implemented by the same table as the game content information management table shown in FIG. 6, provided in the external memory of the terminal device 110.

The opponent character information storage unit 115 may store one or more opponent character attributes assigned to an opponent character and opponent character parameter values that characterize the opponent character, in association with the opponent character identification that identifies the opponent character. The opponent character information storage unit 115 may be implemented by the same table as the opponent character information management table shown in FIG. 7, provided in the external memory of the terminal device 110.

The specific attribute information storage unit 116 may store specific attribute information of an opponent character in association with the player identification; the specific attribute information may be a part or all of one or more opponent character attributes assigned to the opponent character in the opponent character information storage unit 115. The specific attribute information storage unit 116 may be implemented by the same table as the specific attribute information management table shown in FIG. 8*a*, provided in the external memory of the terminal device 110.

The specific attribute information updating unit 117 may update the table for managing specific attribute information managed by the specific attribute information storage unit 116 in accordance with a predetermined condition. The specific method of updating may be the same as described above for the specific attribute information updating unit 57 as far as possible.

When the player character of a player operating the terminal device 110 battles with an opponent character, the effective value calculating unit 118 may calculate the effective value of the game content parameter value for each of the game contents owned by the player, based on the specific attribute information stored in the table for managing the specific attribute information managed by the specific attribute information storage unit 116. The specific method of calculating the effective value may be the same as described above for the effective value calculating unit 58.

The selection unit 119 may select one or more game contents to be used (installed) by the player character of the player in the battle with the opponent character from among game contents owned by the player operating the terminal device 110. The specific method of selecting a game content to be used or installed may be the same as described above for the selection unit 59.

The battle performing unit 120 may cause the player character to use the game content selected by the selection unit 119 and to perform a battle with the opponent character. The specific mode of the battle process may be the same as described above for the battle performing unit 60.

Next, an example of automatic game content selection process performed in the terminal device 110 will be described below with reference to FIG. 12. FIG. 12 is a flow diagram schematically showing the processing in the terminal device 110 from the start of the game program until a battle process is started between a player character and an opponent character. Most of the processing in FIG. 12 is the same as in FIG. 9; therefore, the processing in FIG. 12 will be described with reference to the description related to FIG. 9. In the processing shown in FIG. 12, it is supposed that player character 1 of the player operating the terminal device 110 battles with opponent character 1.

First, in step 1202, a game program may be started in accordance with operation by the player. When the player operates the terminal device 110 to perform a battle with the opponent character, the game progression control unit 51 displays a display screen for performing a battle with the opponent character on the terminal device 110. Next, in step 1206, if the player selects the automatic selection operation button through input operation on the terminal device 110, the process may proceed to step 1208. In step 1208, the effective value calculating unit 118 may calculate an effective value of a game content parameter value of a game content owned by the player operating the terminal device 110. Subsequently, in step 1210, the selection unit 119 may select a weapon item to be used by player character 1 by using the effective value calculated for weapon item. Next, in step 1112, the selection unit 119 may select a protector item to be used by player character 1 by using the effective value calculated for protector item. Next, in step 1112, the selection unit 119 may select a protector item to be used by player character 1 by using the effective value calculated for protector item.

Meanwhile, in step 1206, if the customizing operation button is selected through input operation on the terminal device 110, the processing may proceed to step 1216. In step 1216, the game progression control unit 121 may generate a list of game contents owned by the player who operates the terminal device 110; and a display screen including the list may be displayed on the terminal device 110. When the game content to be used by player character 1 has been determined in accordance with input operation on the terminal device 110 by the player, the processing proceeds to step 1218.

In step 1218, a battle process is started between player character 1 and opponent character 1. The battle process may be performed in the same manner as in FIG. 10 as far as possible.

The terminal device according to the embodiment of the present invention permits a player character to preferentially install a game content that may possibly impart a larger damage on an opponent character, as described for the server device 10. Such a game content may be automatically selected (i.e., without any instruction for selecting a specific game content from the player), except the selecting operation for such selection itself. Accordingly, the player can easily select an item to be used by the player character.

The processes and procedures described and illustrated herein may be implemented by software, hardware, or any combination thereof, in addition to those explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described in the specification are executed by a single apparatus, software, or component in the description, the processes and the procedures can be executed by a plurality of apparatuses, software, and components. Even if the data, tables, or databases described in the specification are stored in a single memory in the description, the data, tables, or databases may be dispersed and stored in a plurality of memories included in a single apparatus or in a plurality of memories dispersed and arranged in a plurality of apparatuses. The elements of the software and the hardware described in the specification can be integrated into fewer constituent elements or can be decomposed into more constituent elements.

With respect to the use of substantially any plural and/or singular terms herein, in addition to terms used without designation of being either plural or singular, those having skill in the art can translate from the plural to the singular and/or from the singular to the plural as is appropriate to the context.

What is claimed is:

1. A server device connected via a network to a plurality of terminal devices each operated by a player, the server device controlling a battle game in which the player battles with an opponent character, the server device comprising:
   a game content ownership-information storage unit configured to store game content ownership information indicating a player owns one or more game contents, wherein the one or more game contents owned by the player include a first game content;
   a game content information storage unit configured to store game content information associated with individual ones of the one or more game contents owned by the player, the game content information including information characterizing the individual ones of the one or more game contents through parameter values;
   a specific attribute information storage unit configured to store in association with the player, specific attribute information indicating the first game content is effective against the opponent character in a battle; and
   a selection unit configured to
      select, from the one or more game contents owned by the player, the first game content based on the specific attribute information indicating the first game content is effective against the opponent character in the battle,
      adjust a parameter value in the game content information associated with the first game content to determine an effective value for the first game content against the opponent character in the battle, and
      determine the first game content should be used in the battle game by the player based on the effective value determined for the first game content.

2. The server device of claim 1 wherein determining the first game content should be used in the battle against the opponent character based on the effective value determined for the first game content by the selection unit comprises:
   comparing the effective value determined for the first game content with a parameter value in the game content information associated with a given one of the one or more game contents owned by the player other than the first game content; and
   determining the effective value determined for the first game content is greater than the parameter value in the game content information associated with the given one of the one or more game contents owned by the player other than the first game content.

3. The server device of claim 1 further comprising:
   a player information storage unit configured to store a parameter value of the player in association with the player;
   an opponent character information storage unit configured to store a parameter value of the opponent character in association with the opponent character; and
   a battle performing unit configured to perform the battle game based on the parameter value of the player, the effective value of the specific game content, and the parameter value of the opponent character if the selection unit selects the specific game content.

4. The server device of claim 1 further comprising a specific attribute information updating unit configured to cause the specific attribute information storage unit to store, in association with the player, the specific attribute information indicating the first game content is effective against the opponent character in a battle by virtue of the first game content was effective against the opponent character in a previous battle.

5. The server device of claim 1, wherein the specific attribute information storage unit stores the specific attribute information stored in association with the player, in association with another player included in the same group as the player.

6. The server device of claim 1 wherein the selection unit is further configured to select a game content to be used by the player responsive to the player requesting, via the terminal device, an automatic selection of the game content by the sever device.

7. The server device of claim 3 wherein the player information storage unit is configured to store a maximum value of the number of game contents usable by the player in association with the player, and the selection unit is configured to select one or more game contents to be used by the player such that the number of game contents to be used by the player does not exceed the maximum value for the player stored in the player information storage unit.

8. The server device of claim 3 wherein the game content information storage unit is further configured to store, in association with a game content, item points to be consumed on use of the associated game content,
and wherein the player information storage unit is configured to store a maximum value of the number of item points consumable by the player in association with the player,
and wherein the selection unit is configured to select one or more game contents to be used by the player such that the sum of item points of the game contents to be used by the player does not exceed the maximum value of the number of item points consumable by the player stored in the player character information storage unit.

9. The server device of claim 8 wherein the selection unit is further configured to select, from the game contents owned by the player, one or more game contents to be used by the player in the battle game, based on the item points of the game content, the parameter values of game contents other than the specific game content, and the effective value of the specific game content.

10. The server device of claim 1, wherein the first game content owned by the player includes a weapon item, an armor item and/or an magic item.

11. The server device of claim 1, wherein the parameter values in the game content information for characterizing the individual ones of the one or more game contents include parameter values related to offensive power and/or defensive power of the individual ones of the one or more game contents.

12. A method using a computer connected via a network to a plurality of terminal devices each operated by a player, the computer controlling a battle game in which the player battles with an opponent character, the method comprising the steps of:
storing one or more game contents owned by a player, the one or more game contents owned by the player including a first game content;
storing game content information associated with individual ones of the one or more game contents owned by the player, the game content information including information characterizing the individual ones of the one or more game contents through parameter values;
storing, in association with the player, specific attribute information indicating the first game content is effective against the opponent character in a battle;
selecting, from the one or more game contents owned by the player, the first game content based on the specific attribute information indicating the first game content is effective against the opponent character in the battle;
adjusting a parameter value in the game content information associated with the first game content to determine an effective value for the first game content against the opponent character in the battle; and
determining the first game content should be used in the battle game by the player based on the effective value determined for the first game content.

* * * * *